United States Patent [19]
Ishida et al.

[11] Patent Number: 5,496,645
[45] Date of Patent: Mar. 5, 1996

[54] MAGNETIC RECORDING MEDIUM COMPRISING A MAGNETIC METALLIC THIN FILM AND A LAYER CONTAINING A SPECIFIED FLUORINE COMPOUND AND A SPECIFIED TETRAZAINDENE CYCLIC COMPOUND OR THIOURACIL CYCLIC COMPOUND

[75] Inventors: Toshio Ishida; Masaki Satake; Tsutomu Okita, all of Odawara, Japan

[73] Assignee: Fuji Photo Film Co., Ltd., Kanagawa, Japan

[21] Appl. No.: 371,672

[22] Filed: Jan. 12, 1995

Related U.S. Application Data

[63] Continuation of Ser. No. 105,070, Aug. 12, 1993, abandoned.

[30] Foreign Application Priority Data

Aug. 12, 1992 [JP] Japan ................... 4-215225

[51] Int. Cl.$^6$ ................................... G11B 5/00
[52] U.S. Cl. .................. 428/457; 428/421; 428/694 TF; 428/900
[58] Field of Search ........................ 428/694 TF, 421, 428/900, 457; 427/130

[56] References Cited

U.S. PATENT DOCUMENTS

| | | | |
|---|---|---|---|
| 4,735,848 | 4/1988 | Kondo et al. | 428/219 |
| 5,069,973 | 12/1991 | Saito et al. | 428/421 |
| 5,112,662 | 5/1992 | Ng | 428/695 |
| 5,128,216 | 7/1992 | Ng | 428/695 |

FOREIGN PATENT DOCUMENTS

| | | |
|---|---|---|
| 0432536 | 6/1991 | European Pat. Off. . |
| 0464991 | 1/1992 | European Pat. Off. . |

OTHER PUBLICATIONS

Database WPI, Week 8646, JP–A–61 223 070, Oct. 3, 1986.

*Primary Examiner*—Stevan A. Resan
*Attorney, Agent, or Firm*—Sughrue, Mion, Zinn, Macpeak & Seas

[57] ABSTRACT

A magnetic recording medium having a magnetic layer on a non-magnetic support, whereby an organic fluorine compound given by the following general formulae (1) or (2) is formed on said magnetic layer:

$$R^1=C-\left(\begin{array}{c}R^2\\|\\C\\|\\B\\|\\Y^2\\|\\Rf^2\end{array}\right)_a-R^3$$
General formula (1)

with the first carbon bearing substituents A, Y$^1$, Rf$^1$ $$R^4-C=C-\left(\begin{array}{c}R^5\\|\\C\\|\\X\\|\\Y^3\\|\\Rf^3\end{array}\right)_b-R^6$$
General formula (2)

with substituents A, B on the C=C carbons and Y$^1$, Y$^2$, Rf$^1$, Rf$^2$ where
Rf$^1$, Rf$^2$ and Rf$^3$ each represents a fluoroalkyl group, Y$^1$, Y$^2$ and Y$^3$ each represents —O—, —OCO—, —COO, —NHCO—, or —CONH— and may be the same or different;

R$^1$ represents =CH$_2$, =CH(CH$_2$)$_k$CH$_3$, or =CHCH=CH$_2$, and k is a number from 0 to 2;

R$^2$ and R$^5$ each represents H, and R$^2$ is not present in case the carbon to which R$^2$ is bonded has double bond.

R$^3$, R$^4$ or R$^6$ each represents H or a hydrocarbon group, which may have double bond.

A, B and X each represents (CH$_2$)$_k$, and k is a number from 0 to 2, and b is a number of 0 or one or higher.

Rf$^1$, Rf$^2$, Rf$^3$, Y$^1$, Y$^2$, Y$^3$, A, B, X, R$^4$, R$^5$, R$^6$, k, n, and m may be the same or different, and these may be cis type or trans type.

4 Claims, No Drawings

5,496,645

MAGNETIC RECORDING MEDIUM COMPRISING A MAGNETIC METALLIC THIN FILM AND A LAYER CONTAINING A SPECIFIED FLUORINE COMPOUND AND A SPECIFIED TETRAZAINDENE CYCLIC COMPOUND OR THIOURACIL CYCLIC COMPOUND

This is a Continuation of application serial No. 08/105,070, filed Aug. 12, 1993 now abandoned.

BACKGROUND OF THE INVENTION

The present invention relates to a magnetic recording medium, in which a lubricating layer containing an organic fluorine compound is formed on a magnetic layer.

A technique is known and used in practical application, in which a lubricant for a magnetic recording medium such as magnetic tape, floppy disk, etc. is coated on the surface of a magnetic layer to improve lubricating property or running durability between the magnetic recording medium and a head, or a lubricant is coated on the surface of a photosensitive material for photography so that it can endure severe operating conditions.

In particular, with rapid technical progress toward the recording with higher density in magnetic recording medium, the surface of the magnetic layer is getting increasingly smoother. Also, magnetic recording medium is used in various environmental conditions, and the recorded information is stored over a period from several years to several tens of years. For this reason, there are strong demands on the medium with high running durability and preservation stability under various environmental conditions, and sufficient results cannot be obtained by conventional type lubricant.

Further, cam-corder, i.e. camera-integrated video tape recorder or small size video tape recorder are frequently used in outdoor application, and high lubricating performance characteristics suitable for the use under extensive environmental conditions are required for a magnetic recording medium.

Metal thin film type magnetic layer is advantageous for high density recording, and there are much expectations on the metal thin film type for the improvement of magnetic recording density such as the implementation of high-vision or digitalization in future. Because metal in the recording layer is protected only by very thin oxide layer in the metal thin film type magnetic recording medium, there is imminent demand on a lubricant, which can extensively improve the preservation property.

Ferromagnetic thin film has high electromagnetic transducing property and is considered very promising as magnetic recording medium for high density recording. In a so-called metal thin film type magnetic recording medium, comprising such ferromagnetic thin film on non-magnetic support, it is known that the use of organic fluorine compound as lubricant is very effective.

It is widely known that an organic fluorine compound containing perfluoroalkyl group has hydrophobic as well as lipophobic property and has the property as surface active agent in both water and oil. Also, it has the property to decrease surface energy, and the organic fluorine compound is practically used by coating it to improve the sliding property or lubricating property of a material.

For example, Japanese Patent Laid-Open Publication No. 58-100228 discloses a technique, in which a compound having sulfonic metal salt as polar group, an ester group as connecting group, and two fluorine-substituted alkyl groups on molecular terminals is mixed in a painting solution containing dispersed magnetic powder, and this is coated. Because this compound contains sulfonic acid metal salts as polar groups and the polar groups have high polarity and have strong property as acid, thin film head used for high density recording may be corroded by this compound.

Japanese Patent Laid-Open Publication No. 3-102614 discloses a lubricant, which has —COCO— and —SS— at the center of perfluoropolyether chain, but there is also the problem of corrosion of thin film head by this lubricant.

Japanese Patent Laid-Open Publication No. 64-72313 describes the formation of a monomolecular layer of perfluoroalkyl group - alkyl group - polar group on ferromagnetic metallic thin film. However, the formation of monomolecular film by Langmuir-Blodgett's (LB) film is poor in productivity and is not very practical. Further, it is inferior in μ value, still durability and preservation property.

In Japanese Patent Publication No. 3-19602 and Japanese Patent Laid-Open Publication No. 54-79366, a lubricant is disclosed, which contains fluorine type hydrocarbon compound having —$SO_3Na$, —$SO_3K$, —$SO_3H$, —COOH, etc., but this is also inferior in μ value, still durability, and preservation property.

Japanese Patent Laid-Open Publications No. 3-241524 and No. 62-92227 describe the coating of a compound having fluoroalkyl group and aliphatic alkyl group on ferromagnetic metallic thin film. Although this compound can be coated by isopropanol through the introduction of alkyl group, it is inferior in μ value, still durability and preservation property.

In addition to the coating of the above lubricant on magnetic recording layer, the use of perfluoroalkyl polyether and its derivatives is described (Japanese Patent Laid-Open Publications No. 60-61918, No. 61-107528, U.S. Pat. No. 3,778,308, Japanese Patent Publication No. 60-10368, U.S. Pat. No. 4,897,211, etc.). However, the lubricants containing fluorine type organic compound has high friction coefficient at low speed with the partner material when tape is sliding. The lubricants have also problems with preservation property because magnetic layer is detached due to corrosion by acidic gas such as sulfur dioxide and are not suitable as magnetic recording medium used in practical application.

Fatty acids and fatty acid esters (Japanese Patent Publications No. 28-28367, No. 51-39081, No. 51-30981, Japanese Patent Laid-Open Publications No. 56-80828 and No. 61-24017) have high speed friction with magnetic head and are not suitable for practical use. It is also inferior in the problem of corrosion due to acidic gas such as sulfur dioxide.

Most of the above lubricants are not soluble in organic solvents of normal hydrocarbon type, such as acetone, methylethylketone, ethyl acetate, alcohols, toluene, etc., and it is necessary to use fluorine type organic solvents when coating. However, fluorine type organic solvents are expensive and also cause the problem of the destruction of ozone layer or aggravate the working environment and are not suitable for practical application.

It is an object of the present invention to provide a lubricant, which is soluble in general hydrocarbon type organic solvents and contains fluorine type organic compound without the need of using fluorine type organic solvents and also to provide a magnetic recording medium, which comprises metal thin film for extensively improving recording density by deposition, sputtering, etc. and which can offer high running property, durability and preservation property.

Further, it is another object of the present invention to provide a magnetic recording medium which has sufficient running property and durability even in outdoor environment and which does not corrode magnetic head for high density recording such as thin film head.

SUMMARY OF THE INVENTION

The magnetic recording medium according to the present invention comprises a magnetic layer at least on one side of a non-magnetic support, whereby a layer containing an organic fluorine compound is formed on said magnetic layer, said organic fluorine compound has a carbon skeleton of alkylene, a fluoroalkyl containing group comprising a fluoroalkyl group and other atom or a group of atoms is bonded to at least two carbon atoms, which constitute said carbon skeleton, and at least one of said fluoroalkyl containing groups is bonded to a carbon with double bond.

Also, the invention provides a magnetic recording medium, in which a layer containing an organic fluorine compound given by the following general formula (1) is formed on a magnetic layer:

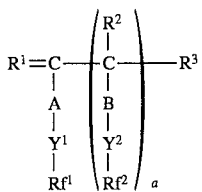

General formula (1)

where $Rf^1$ and $Rf^2$ each represents $CF_3CF_2(CF_2)_n(CH_2)_m-$ or $(CF_3)_2CF(CF_2)_n(CH_2)_m-$ respectively and may be different or the same, and n is a number from 10, m is a number from 1 to 20, and n+m is a number from 6 to 30;

$Y_1$ and $Y^2$ each represents $-O-$, $-OCO-$, $-COO-$, $-NHCO-$ or $-CONH-$ respectively and may be different or the same;

$R^1$ represents $=CH_2$, $=CH(CH_2)_kCH_3$ or $=CHCH=CH_2$, and k is a number from 0 to 2;

Also, $R^2$ represents H or a hydrocarbon group, and $R^2$ is not present in case the carbon to which $R^2$ is bonded has double bond.

$R^3$ represents H or a hydrocarbon group, which may have double bond;

A and B each represents $(CH_2)_k$, where k is a number from 0 to 2, and a is a number of 1 or higher;

$Rf^1$, $Rf^2$, $Y^1$, $Y^2$, $R^1$, $R^2$, $R^3$, k, n and m may be the same or different, and these may be either cis type or trans type.

Also, the present invention provides a magnetic recording medium, in which a layer containing an organic fluorine compound given by the following general formula (2) is formed on a magnetic layer:

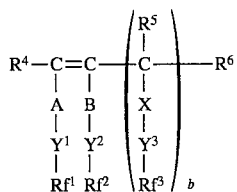

General formula (2)

where $Rf^1$, $Rf^2$, and $Rf^3$ each represents $CF_3CF_2(CF_2)_n(CH_2)_m-$ or $(CF_3)_2CF(CF_2)_n(CH_2)_m-$ and may be the same or different and n is a number from 1 to 10, m is a number from 1 to 20, and n+m is a number from 6 to 30;

$Y^1$, $Y^2$ and $Y^3$ each represents $-O-$, $-OCO-$, $-COO-$, $-NHCO-$ or $-CONH-$ and may be the same or different;

$R^4$ represents H or a hydrocarbon group, which may have double bond;

$R^5$ represents H or a hydrocarbon group, and $R^5$ is not present in case the carbon to which $R^5$ is bonded has double bond;

$R^6$ represents H or a hydrocarbon group, which may have double bond.

A, B and X each represents $(CH_2)_k$, where k is a number from 0 to 2, and b is a number of 0 or 1 or higher.

$Rf^1$, $Rf^2$, $Rf^3$, $Y^1$, $Y^2$, $Y^3$, A, B, X, $R^4$, $R^5$, $R^6$, k, n and m may be the same or different, and these may be either cis type or trans type.

Also, the present invention provides a magnetic recording medium, wherein the magnetic layer having a layer containing an organic fluorine compound formed on it is a ferromagnetic metallic thin film.

It is also a magnetic recording medium, wherein the layer containing organic fluorine compound contains a rust preventive, which comprises tetrazaindene type compound and/or thiouracil compound.

The present invention also provides a method for manufacturing a magnetic recording medium, which has a magnetic layer at least on one side of a non-magnetic support, whereby an organic fluorine compound is dissolved in at least one of solvents selected from acetone, methylethylketone, methylisobutylketone, cyclohexanone, methanol, ethanol and isopropanol, said organic fluorine compound has a carbon skeleton of alkylene, a fluoroalkyl containing group consisting of a fluoroalkyl group and other atom or a group of atoms is bonded to at least two carbon atoms, which constitute the carbon skeleton, at least one fluoroalkyl containing group is bonded to a carbon with double bond, said solution is coated on the magnetic layer and dried to prepare the magnetic recording medium.

DESCRIPTION OF THE PREFERRED EMBODIMENT

The magnetic recording medium of the present invention comprises a magnetic layer formed at least on one side of a non-magnetic support, a layer containing an organic fluorine compound is formed on said magnetic layer, said organic fluorine compound has a carbon skeleton of alkylene, a fluoroalkyl containing group comprising a fluoroalkyl group and other atom or a group of atoms is bonded to at least two carbon atoms, which constitute the carbon skeleton, and at least one fluoroalkyl containing group is bonded to a carbon having double bond, and a layer containing fluorine type organic compound given by the following general formulae (1) or (2) is formed on a magnetic layer:

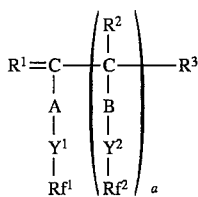

General formula (1)

where

Rf$^1$ and Rf$^2$ each represents $CF_3CF_2(CF_2)_n(CH_2)_m-$ or $(CF_3)_2CF(CF_2)_n(CH_2)_m-$ and may be the same or different, and n is a number from 1 to 10, m is a number from 1 to 20, and n+m is a number from 6 to 30;

Y$_1$ and Y$_2$ each represents —O—, —OCO—, —COO—, —NHCO—, —CONH— and may be the same or different;

R$^1$ represents $=CH_2$, $=CH(CH_2)_kCH_3$, $=CHCH=CH_2$, and k is a number from 0 to 2;

R$^2$ represents H or a hydrocarbon group, and R$^2$ is not present in case carbon to which R$^2$ is bonded has double bond.

R$^3$ represents H or a hydrocarbon group, which may have double bond.

A and B each represents $(CH_2)_k$, and k is a number from 0 to 2, and a is a number of one or higher.

Rf$^1$, Rf$^2$, Y$^1$, Y$^2$, R$^1$, R$^2$, R$^3$, k, n, and m may be the same or different, and these may be either cis type or trans type.

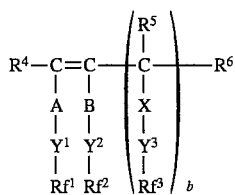

General formula (2)

where

Rf$^1$, Rf$^2$ and Rf$^3$ each represents $CF_3CF_2(CF_2)_n(CH_2)_m-$ or $(CF_3)_2CF(CF_2)_n(CH_2)_m-$ and may be the same or different, and n is a number from 1 to 10, m is a number from 1 to 20, and n+m is a number from 6 to 30;

Y$^1$, Y$^2$ and Y$^3$ each represents —O—, —OCO—, —COO—, —NHCO—, or —CONH—, and may be the same or different;

R$^4$ represents H or a hydrocarbon group, which may have double bond;

R$^2$ represents H or a hydrocarbon group, and R$^5$ is not present in case the carbon to which R$^5$ is bonded has double bond.

R$^6$ represents H or a hydrocarbon group, which may have double bond;

A, B and X each represents $(CH_2)_k$, and k is a number from 0 to 2, and b is a number of 0 or one or higher;

Rf$^1$, Rf$^2$, Rf$^3$, Y$^1$, Y$^2$, Y$^3$, A, B, X, R$^4$, R$^5$, R$^6$, k, n and m may be the same or different, and these may be either cis type or trans type.

Further, in the general formulae (1) or (2), n is preferably a number of 2 to 8. If it is too big, solubility in hydrocarbon type solvent decreases, If it is too small, friction coefficient increases and lubricating property is worsened. It is particularly preferable that m is a number of 2 to 11. In contrast to n, if m is too small, the solubility in hydrocarbon solvent decreases. If it is too big, friction coefficient increases, and lubricating property is worsened. It is preferable that n+m is a number of 6 to 19. If it is too big, the solubility in hydrocarbon type solvent decreases. If it is too small, friction coefficient increases, and lubricating property is worsened.

It is preferable that Y$^1$, Y$^2$ and Y$^3$ each represents —OCO— or —COO—, and —S—, —SO—, —SO$_2$—, etc. are not very preferable because of corrosive property.

If R$^1$, R$^2$, R$^3$, R$^4$, R$^5$ or R$^6$ is big, friction coefficient increases. Thus, it is preferable that these have fewer carbon atoms.

In the magnetic recording medium of the present invention, magnetic power dispersed in a binding material and coated on a non-magnetic support, or ferromagnetic metallic thin film formed on a non-magnetic support may be used as the magnetic layer. It is preferable that ferromagnetic metallic thin film comprising metal such as iron, nickel, cobalt, etc. or an alloy thereof is used as the magnetic layer.

It is preferable to use a film of PET, PEN, polyamide, polyimide resin, etc. of 5–15 µm in thickness as the non-magnetic support, and the thickness of the magnetic layer is preferably 0.1–0.3 µm. It is particularly preferable to use the magnetic layer of mono-layer, parallel type multi-layer or non-parallel type multi-layer containing cobalt by 80 weight % or more and nickel, chromium, etc. To form the magnetic layer, deposition, sputtering, etc. may be used. It is particularly preferable to form the magnetic layer by deposition method in the presence of oxygen.

It is advantageous for increasing running property, durability, etc. to have a back layer or an undercoating layer for the magnetic layer.

It is possible to add the lubricant of the present invention by coating on a thin film metal recording film, which is formed by adding a carbon film (volatile compound including alkane such as $CH_4$, $C_2H_6$, $C_3H_8$, $C_4H_{10}$, etc., alkene such as $CH_2=CH_2$, $CH_3CH=CH_2$, etc., alkyne such as $CH\equiv CH$, etc.) formed on metal thin film magnetic layer by plasma CVD.

The layer containing organic fluorine compound of the present invention does not have hydrophilic polar group such as carboxylic acid, sulfonic acid, etc. and has therefore rust-preventive property. Further, the property as magnetic recording medium can be improved further if it contains a rust preventive, which consists of tetrazaindene cyclic compound and/or thiouracil cyclic compound.

As tetrazaindene cyclic compound usable for this purpose, there is a compound given by the following formula:

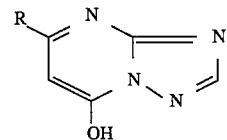

where R represents a hydrocarbon group selected from an alkyl group, an alkoxyl group or an alkylamide group, and a part of hydrogen atoms may be substituted by fluorine atoms.

Preferably, the number of carbon atoms is between 3 and 26 inclusive. In case of alkoxyl group, R in ROCOCH$_2$— is $C_3H_7-$, $C_6H_{13}-$ or phenyl. In case of alkyl group, it represents $C_6H_{13}-$, $C_9H_{19}-$, or $C_{17}H_{35}-$. In case of alkylamide group, R in RNHCOCH$_2$— is phenyl or $C_3H_7-$.

As thiouracil cyclic compound, there is a compound given by the following formula:

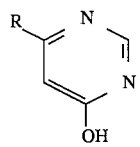

where R is a hydrocarbon group having 3 or more carbon atoms, and a part of hydrogen atoms may be substituted by fluorine atoms.

The lubricant and the rust preventive may be mixed and simultaneously coated, while it is more effective to coat the rust preventive first, and the lubricant thereafter. To coat, these may be dissolved in an organic solvent and coated by normal coating procedure such as coil bar.

It is preferable to coat the rust preventive by 0.1 to 10.0 mg/m², and the lubricant by 1.0 to 50 mg/m². More preferably, the rust preventive is coated by 0.3 to 5 mg/m² and the lubricant by 3 to 30 mg/m²

In addition to the lubricant containing organic fluorine compound of the present invention, other lubricant may be used simultaneously. For example, perfluoropolyether given by the following formula:

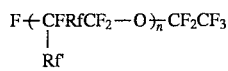

or the above compound with its terminal denatured with OH, COOH, etc. may be used. In this case, Rf represents $CF_3$ or F, and Rf' is not present or represents $CF_3$.

The molecular weight of this product is 1000–20000, or preferably, 2500–10000. More concretely, it is KRYTOX K143AZ or KRYTOX K157FSL manufactured by DuPont, FOMBLIN AM2001 manufactured by Montefluos, DEMNUMSY manufactured by Daikin Industry.

When applying the compound of the present invention on a magnetic recording medium, it is coated on the surface of the magnetic layer as solution. In this case, the compound of the present invention is soluble in at least one of the hydrocarbon type solvents selected from acetone, methylethylketone, methylisobutylketone, cyclohexanone, methanol, ethanol and isopropanol. Thus, magnetic recording medium can be produced by coating and drying but without using fluorine type organic solvent. Because the compound is soluble in hydrocarbon type solvent, there is no possibility to cause environmental problem due to the use of fluorine type solvents as often seen in conventional type fluorine compound.

In the magnetic recording medium having a magnetic layer at least on one side of a non-magnetic support of the present invention, a compound is formed on the magnetic layer, said compound contains a carbon skeleton of alkylene, a fluoroalkyl containing group comprising a fluoroalkyl group and other atom or a group of atoms is bonded to at least two carbon atoms, which constitute the carbon skeleton, and at least one fluoroalkyl containing group is bonded to double bond. Accordingly, double bond is adsorbed on the surface of magnetic layer, and fluoroalkyl group is arranged on the surface as a protective layer and provides lubricating property. Because adsorption to the magnetic layer is achieved by double bond, thin film head is not adversely affected as in the cases of acidic or alkaline adsorption group. Also, because there is no hydrophilic polar group such as carboxylic acid, sulfonic acid, or alcohol, water adsorption property is low and rust preventive property is high. Further, it is soluble in hydrocarbon type organic solvent and coating film can be easily formed on the magnetic layer.

In the following, detailed description will be given on the present invention in connection with the embodiments: (Synthesis of the compound of specimen No. 4)

To a four-mouth 300 ml flask with agitator equipped with reflux condenser and thermometer, 3.87 g (0.03 mol) of itaconic acid [molecular formula: $CH_2=C(COOH)CHCOOH$] and 100 ml of acetone were placed. After dropping perfluorooctylethanol $[F(CF_2)_8CH_2CH_2OH]$ into it at 30° C., it was agitated for 10 hours while heating. Then, raw material of perfluoroalcohol was removed by distilling, and recrylstallization was performed with methanol, and $C_8F_{17}$, $CH_2CH_2OCOC(=CH_2)COOCH_2CH_2C_8F_{17}$ was obtained. The compound thus obtained was confirmed of its molecular weight by mass spectrometry, and the compound was identified by nuclear magnetic resonance. The purity determined by nuclear magnetic resonance was 80% or more (compared with raw material).

The data determined by NMR (Varian; Gemini-300) were as follows:

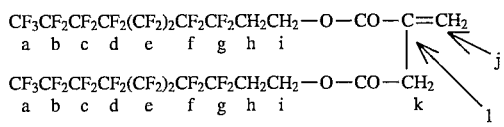

¹⁹H-NMR analysis (unit: ppm; solvent: methanol d₄)
¹H-NMR analysis (unit: ppm; solvent: methanol d₄)
Terminal $CF_3$ (a): −79.3 (triplet)
Position 2 $CF_2$ (b): −1P4.3 (broad)
Position 3 $CF_2$ (c): −121.6 (broad)
Position 4 $CF_2$ (d): −120.7 (broad)
Position 5 $CF_2$ (e): −119.5 (broad)
Position 6 $CF_2$ (e): −119.5 (broad)
Position 7 $CF_2$ (f): −119.5 (broad)
Position 8 $CF_2$ (g): −111.6 (broad)
Position 9 $CH_2$ (h): 2.6 (multiplet)
Position 10 $CH_2$ (i): 4.39 (triplet)
Position 11 $CH_2$ (j): 4.46 (triplet)
$CH_2$ on side of carbonyl group (k): 3.42
Double bond (1): 5.82

The other compounds were synthesized by the same procedure, except that itaconic acid was replaced by an anhydride having other double bond such as maleic acid anhydride or carboxylic acid, or perfluoroalkylethanol was replaced by other fluoroalkyl alcohol.

(EXAMPLES AND COMPARATIVE EXAMPLES)

On a polyethylene terephthalate of 10 μm thick, a cobalt-nickel magnetic film (thickness: 150 nm) was deposited diagonally to prepare a magnetic metallic thin film. Using electron beam evaporating source as evaporating source, cobalt-nickel alloy (Co: 80 weight %; Ni: 20 weight %) was filled in it, and diagonal deposition was performed under vacuum degree of 6.7×10⁻³ N/m² at an incident angle of 50° while introducing oxygen gas. On the magnetic metallic thin film layer thus obtained, each of the compounds shown in Table 1 was coated by coil bar and dried. Then, a back layer was provided, and this was slit to prepare a magnetic tape of 8 mm wide. For the specimens No. 6, No. 7 and No. 14, rust preventives were mixed and this mixture was coated. The specimens Nos. 8 to 15 were used as comparative examples.

Examples and comparative examples are summarized in Table 1 together with the results of evaluation.

The compound according to the present invention shows excellent effect for the prevention of rusting and head corrosion. Even when it is added in large quantity to rust preventive, stable running is assured without increasing friction coefficient. In contrast, the material having polar group has insufficient rust preventive property after storage, and running property decreases. When rust preventive is added in such quantity as to improve the prevention of rusting and output decrease, friction coefficient increases.

(Method of evaluation)
(Determination of friction coefficient)

The magnetic tape obtained and a stainless ball were brought into contact by binding them with tensile force ($T_1$) of 30 g at an angle of 180°, and the magnetic tape was run by 100 passes at a rate of 3.3 cm/sec. Then, the tensile force ($T_2$) required for the running was determined. Friction coefficient μ of the magnetic tape was obtained by the following equation:

$$\mu = 1/\pi \cdot l_n(T_2/T_1)$$

Friction coefficient was determined at 23° C. and 70% relative humidity for the following two cases: (A) With the condition unchanged (before storage); (B) After stored for 10 days at 60° C. and 90% relative humidity.

(Determination of still durability)

Using 8 mm VTR (Fuji Photo Film Co., Ltd.; FUJIX-8M6), an image was reproduced in still condition without operating still limiting mechanism, and still durability was determined by measuring the time until the image does not appear any more.

Still durability was determined at 5° C. and 10% relative humidity in the following two cases: (A) The condition unchanged (before storage); (B) After stored for 10 days at 60° C. and 90% relative humidity.

(Determination of reproduction output decrease after storage)

A signal of 7 MHz was recorded by the 8 mm VTR as described above, and the recording medium was stored for 7 days under the conditions of 60° C. and 90% relative humidity, and output decrease was determined. In this case, reproduction output before storage was set to 0 dB.

(Evaluation of weatherproof property)

The recording medium was stored under the following conditions, and the surface of the magnetic layer after storage was examined by visual inspection and under light microscope.

$Cl_2$: 10 ppb $NO_2$: 200 ppb $H_2S$: 10 ppb

Flow rate of the mixture of the above three gases: 1000 liters/hr.

Temperature and humidity: 60° C.; 90% RH

Days of storage: 10 days

| | |
|---|---|
| ○ | When the surface of the magnetic layer is examined under light microscope (×200), there is no sign of corrosion. |
| Δ | When examined as above, corrosion is found, but metallic luster is seen on the surface of the magnetic layer by visual inspection. |
| X | When examined by visual inspection, no metallic luster is observed on the surface of the magnetic layer. |

(Corrosion test of head)

Thin film head and tape were brought into contact and were stored at 60° C. and 80% relative humidity for 3 days. Corrosion of head was confirmed under microscope (×200).

| | |
|---|---|
| ○ | When the surface of head is examined underlight microscope (×200), there is no sign of corrosion. |
| Δ | When examined as above, spot-like corrosion is found on the portion where the tape was in contact. |
| X | When examined as above, corrosion is found all over the portion where the tape was in contact. |

TABLE 1

| Specimen No. | Lubricant and rust preventive | Coated q'ty (mg/m²) | Rust | Output decrease (dB) | Still (min.) | μ value | Head corrosion |
|---|---|---|---|---|---|---|---|
| 1 | $CF_3(CF_2)_3CH_2CH_2OCOC=CH_2$ <br> \| <br> $CF_3(CF_2)_3CH_2CH_2OCOCH_2$ | 15 | ○ | 0.3 | 30 or more <br> 30 or more | 0.23 <br> 0.23 | ○ |
| 2 | $CF_3(CF_2)_7CH_2CH_2OCOC=CH_2$ <br> \| <br> $CF_3(CF_2)_7CH_2CH_2OCOCH_2$ | 15 | ○ | 0.2 | 30 or more <br> 30 or more | 0.2 <br> 0.20 | ○ |
| 3 | $CF_3(CF_2)_9(CH_2)_{11}OCOC=CH_2$ <br> \| <br> $CF_3(CF_2)_9(CH_2)_{11}OCOCH_2$ | 15 | | 0.3 | 30 or more <br> 30 or more | 0.21 <br> 0.21 | ○ |
| 4 | $CF_3(CF_2)_7(CH_2)_2OCOCH$ <br> \|\| <br> $CF_3(CF_2)_7(CH_2)_2OCOCH$ | 15 | ○ | 0.3 | 30 or more <br> 30 or more | 0.19 <br> 0.19 | ○ |
| 5 | $CF_3(CF_2)_7(CH_2)_{11}COOCCH_3$ <br> \|\| <br> $CF_3(CF_2)_7(CH_2)_{11}COOCH$ | 15 | ○ | 0.7 | 30 or more <br> 30 or more | 0.22 <br> 0.24 | ○ |
| 6 | $CF_3(CF_2)_7CH_2CH_2OCOC=CH_2$ <br> \| <br> $CF_3(CF_2)_7CH_2CH_2OCOCH_2$ | 15 | | | 30 or more | 0.2 | |

TABLE 1-continued

| Specimen No. | Lubricant and rust preventive | Coated q'ty (mg/m²) | Rust | Output decrease (dB) | Still (min.) | μvalue | Head corrosion |
|---|---|---|---|---|---|---|---|
|  | $C_6H_{13}OCOCH_2$-[pyrazolopyrimidine with OH] | 3 | ○ | 0 | 30 or more | 0.2 | ○ |
| 7 | $CF_3(CF_2)_7CH_2CH_2OCOC=CH_2$ \| $CF_3(CF_2)_7CH_2CH_2OCOCH_2$ | 15 |  |  | 30 or more | 0.5 |  |
|  | $C_3H_7$-[pyrimidine with SH, OH] | 3 | ○ | 0 | 30 or more | 0.55 | ○ |
| 8 | $C_8F_{17}CH_2CH_2OCOCH=CH_2$ | 15 |  |  | 22 | 0.6 or more |  |
|  |  |  | △ | Not measurable | 18 | 0.6 or more | ○ |
| 9 | $CH_3(CH_2)_{16}COOCH_2CH_2(CF_2)_7CF_3$ | 15 |  |  | 25 | 0.32 |  |
|  |  |  | X | Not measurable | 18 | 0.6 or more | ○ |
| 10 | $CH_2COOCH_2CF_2CF_2CF_3$ \| $NaO_3S-CHCOOCH_2CF_2CF_2CF_3$ | 15 | X | Not measurable | 25 / 15 | 0.3 / 0.6 or more | X |
| 11 | $CHCOOCH_2(CF_2)_3H$ \| $NaO_3S-CHCOOCH_2(CF_2)_3H$ | 15 | X | Not measurable | 15 / 3 | 0.25 / 0.41 | X |
| 12 | $CF_3(CF_2)_7CH_2COOH_3^{\ominus}NC_{16}H_{33}^{\oplus}$ | 15 | △ | Not measurable | 25 / 17 | 0.25 / 0.41 | △ |
| 13 | $CF_3(CF_2)_7(CH_2)_{10}COOH$ | 15 |  |  | 30 or more |  0.25 |  |
|  |  |  | △ | Not measurable | 25 | 0.40 | X |
| 14 | $CF_3(CF_2)_7(CH_2)_{10}COOH$ | 15 |  |  | 30 or more | 0.35 |  |
|  | $C_3H_7$-[pyrimidine with SH, OH] | 3 | ○ | 2 | 30 or more | 0.35 | X |
| 15 | KRYTOX K157FSL | 10 |  |  | 30 or more | 0.27 |  |
|  |  |  | X | Not measurable | 30 or more | 0.52 | X |

KRYTOX K157FSL  $F(CFCF_2O)_n CFCOOH$
  $\quad\quad\quad\quad\quad\quad\quad\;\; |\quad\quad\quad\;\; |$
  $\quad\quad\quad\quad\quad\quad\quad CF_3\quad\;\; CF_3$ As described above, it is possible by the present invention, to produce a protective layer having high preservation property, running property and durability not achievable by conventional type lubricant and to provide a high density magnetic recording medium. In the lubricant having specific structure as disclosed by the present invention, lubricant is adsorbed on the surface of a magnetic layer using connecting group and double bond. As the result, it is estimated that water-repellent and oil-repellent protective layer having a plurality of perfluoroalkyl chains is oriented on the surface, and this reduces surface energy and gives good lubricating property. In this case, adsorption group is estimated to be a double bond, and it is neither acidic nor alkaline, but it is neutral. Thus, the head vulnerable to acid or base is not corroded, and satisfactory image quality is assured. The compound of the present invention exhibits high solubility in hydrocarbon type organic solvent because it has electronic cloud of connecting group and double bond as well as perfluoroalkyl chain and hydrocarbon component in a molecule. With regard to rust preventive property, the compound of the present invention does not have hydrophilic polar group as carboxylic acid, sulfonic acid or alcohol, and it has higher rust presentive property than the compound having such polar group because it prevents adsorption of water. Further, when simultaneously used with rust preventives such as thiouracil containing hydrocarbon or tetrazaindene cyclic compound, still higher preservation property can be obtained. This may be attributable to the fact that adsorption points on double bond of the lubricant differs from adsorption points of NH, OH, SH, etc. of the rust preventives, and as the result, running property is not reduced and rust preventive effect can be obtained.

What we claim is:

1. A magnetic recording medium comprising a magnetic metallic thin film on at least one side of a non-magnetic support, wherein a layer containing an organic fluorine compound and a rust preventive is formed on said magnetic metallic thin film, wherein the organic fluorine compound is given by the following general formula (1):

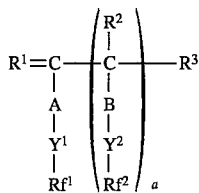

General formula (1)

wherein

Rf$^1$ and Rf$^2$ each represents CF$_3$CF$_2$(CF$_2$)$_n$(CH$_2$)$_m$— or (CF$_3$)$_2$CF(CF$_2$)$_n$(CH$_2$)$_m$— respectively and may be different or the same, and n is a number from 1 to 10, m is a number from 1 to 20, and n+m is a number from 6 to 30;

y$^1$ and Y$^2$ each represents —O—, —OCO—, —COO—, —NHCO— or —CONH— and may be different or the same;

R$^1$ represents =CH$_2$, =CH(CH$_2$)$_k$CH$_3$ or =CHCH=CH$_2$, and k is a number from 0 to 2;

R$^2$ represents H, and R$^2$ is not present when the carbon atom to which R$^2$ is bonded has a double bond;

R$^3$ represents H;

A and B each represents (CH$_2$)$_k$, where k is a number from 0 to 2, and a is a number of 1 or 2;

Rf$^1$, Rf$^2$, Y$^1$, Y$^2$, R$^1$, R$^2$, R$^3$, k, n and m may be the same or different, and they may be either cis type or trans type, and wherein the rust preventive comprises a tetrazaindene cyclic compound represented by the following formula:

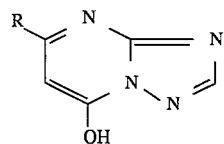

wherein

R represents a C$_3$ to C$_{26}$ hydrocarbon group selected from an alkyl group, an alkoxyl group, or an alkylamide group, and hydrogen atoms may be substituted by fluorine atoms, or a thiouracil cyclic compound represented by the following formula:

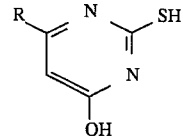

wherein

R represents a hydrocarbon group having 3 carbon atoms, and hydrogen atoms may be substituted by fluorine atoms.

2. A magnetic recording medium according to claim 1, wherein said magnetic metallic thin film is a ferromagnetic metallic thin film.

3. A magnetic recording medium according to claim 1, wherein the rust prevention comprises the tetrazaindene cyclic compound and R in the tetrazaindene cyclic compound is selected from the group consisting of C$_6$H$_{13}$—, C$_9$H$_{19}$—, C$_6$H$_{13}$OCOCH$_2$—, C$_3$H$_7$OCOCH$_2$—, C$_{17}$H$_{35}$—,

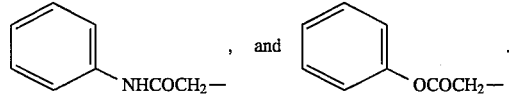

4. A magnetic recording medium according to claim 1, wherein the rust preventive comprises the thiouracil compound and R in the thiouracil cyclic compound is C$_3$H$_7$—.

* * * * *